(12) United States Patent
Miyamoto

(10) Patent No.: US 8,459,119 B2
(45) Date of Patent: Jun. 11, 2013

(54) METHOD OF DETERMINING PROPAGATION TIME OF ULTRASONIC FROM MOVABLE BODY AND SYSTEM THEREOF

(75) Inventor: Junichi Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 844 days.

(21) Appl. No.: 12/524,756

(22) PCT Filed: Jan. 28, 2008

(86) PCT No.: PCT/JP2008/051225
§ 371 (c)(1),
(2), (4) Date: Jul. 28, 2008

(87) PCT Pub. No.: WO2008/091012
PCT Pub. Date: Jul. 31, 2008

(65) Prior Publication Data
US 2010/0005890 A1    Jan. 14, 2010

(30) Foreign Application Priority Data

Jan. 28, 2007 (JP) .................................. 2007-017211
Jan. 28, 2008 (JP) .................................. 2008-016381

(51) Int. Cl.
*G01N 21/00* (2006.01)

(52) U.S. Cl.
USPC ................................ 73/602; 73/597; 367/125

(58) Field of Classification Search
USPC ............ 73/597, 584, 587, 602, 632; 367/125, 367/128
See application file for complete search history.

(56) References Cited

U.S. PATENT DOCUMENTS 4,297,607 A * 10/1981 Lynnworth et al. ........... 310/334
4,814,552 A * 3/1989 Stefik et al. ................ 178/19.02
(Continued)

FOREIGN PATENT DOCUMENTS

CN        102500747 A   *  6/2012
JP         03269387 A   * 11/1991
(Continued)

OTHER PUBLICATIONS

International Search Report for PCT/JP2008/051225 mailed Feb. 19, 2008.

(Continued)

*Primary Examiner* — Peter J Macchiarolo
*Assistant Examiner* — Samir M Shah

(57) ABSTRACT

For precisely determining a position of an electronic pen using ultrasonic, only a direct wave arriving first at a reception device is detected without being affected by a reflected wave of an ultrasonic signal to count a propagation time of the electronic pen.
An infrared signal including a trigger signal indicative of transmission timing and data indicative of an M-sequence initial condition, and an ultrasonic signal made into an M-sequence are simultaneously sent from the electronic pen in each fixed transmission cycle. The reception device disposed at a predetermined position receives the infrared signal from the electronic pen to generate an M-sequence model waveform from M-sequence initial condition data that the infrared signal includes. The reception device further receives the ultrasonic signal from the electronic pen to calculate a value of correlation between the ultrasonic signal and the above-described M-sequence model waveform. Upon detecting a first peak of the calculated correlation value, the reception device calculates a propagation time of ultrasonic from the electronic pen from a time point of reception of the previously received trigger signal and a time point of detection of the detected correlation peak.

45 Claims, 10 Drawing Sheets

U.S. PATENT DOCUMENTS

| | | | |
|---|---|---|---|
| 4,991,148 A * | 2/1991 | Gilchrist | 367/124 |
| 5,339,259 A * | 8/1994 | Puma et al. | 702/153 |
| 5,372,138 A * | 12/1994 | Crowley et al. | 600/463 |
| 5,421,338 A * | 6/1995 | Crowley et al. | 600/463 |
| 5,515,853 A * | 5/1996 | Smith et al. | 600/437 |
| 5,517,579 A * | 5/1996 | Baron et al. | 382/187 |
| 5,524,630 A * | 6/1996 | Crowley | 600/466 |
| 5,588,432 A * | 12/1996 | Crowley | 600/439 |
| 5,715,825 A * | 2/1998 | Crowley | 600/462 |
| 5,750,941 A * | 5/1998 | Ishikawa et al. | 178/19.02 |
| 5,840,031 A * | 11/1998 | Crowley | 600/440 |
| 5,867,146 A * | 2/1999 | Kim et al. | 345/158 |
| 5,977,958 A * | 11/1999 | Baron et al. | 345/179 |
| 6,004,269 A * | 12/1999 | Crowley et al. | 600/439 |
| 6,118,205 A | 9/2000 | Wood et al. | |
| 6,745,632 B1 * | 6/2004 | Dryer et al. | 73/597 |
| 6,771,006 B2 * | 8/2004 | Zioter et al. | 310/334 |
| 6,798,403 B2 * | 9/2004 | Kitada et al. | 345/173 |
| 7,336,262 B2 * | 2/2008 | Tsuji | 345/173 |
| 2004/0032399 A1 * | 2/2004 | Sekiguchi et al. | 345/173 |
| 2005/0150697 A1 * | 7/2005 | Altman et al. | 178/19.02 |
| 2008/0084789 A1 * | 4/2008 | Altman | 367/127 |
| 2008/0166048 A1 * | 7/2008 | Raif et al. | 382/187 |
| 2011/0261654 A1 * | 10/2011 | Miyamoto et al. | 367/125 |

FOREIGN PATENT DOCUMENTS

| | | |
|---|---|---|
| JP | 07-104063 A | 4/1995 |
| JP | 2002139565 A | 5/2002 |
| WO | 2005111653 A | 11/2005 |

OTHER PUBLICATIONS

H. Kashiwagi, "M-sequence and Its Applications", Shokodo, Mar. 25, 1996, p. 1-5, 16-32.

* cited by examiner

RECEPTION DEVICE 3

FIG. 6    COMPOSITE ULTRASONIC WAVEFORM
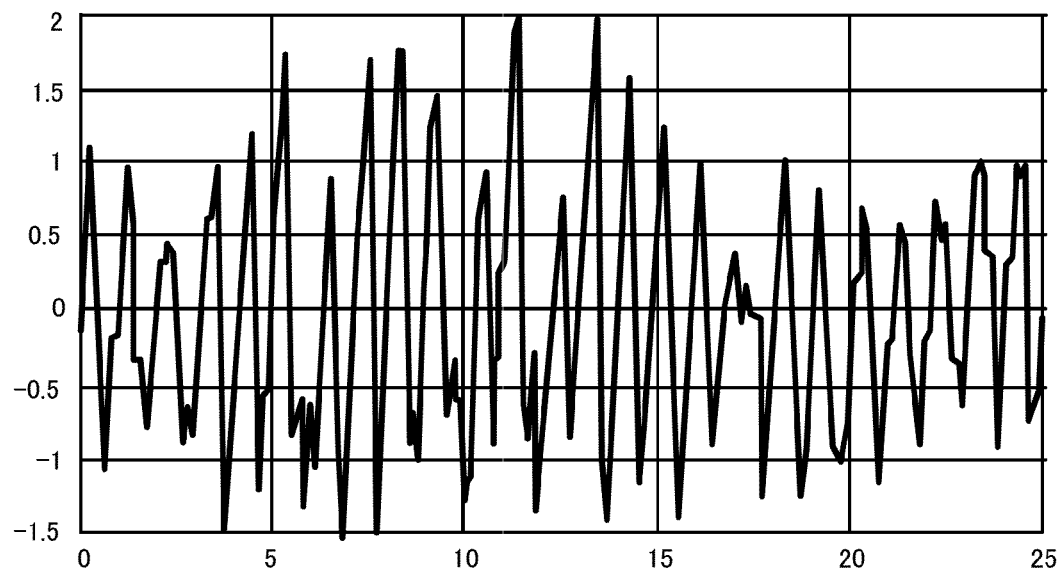
FIG. 7    PRECEDING REFLECTED WAVE
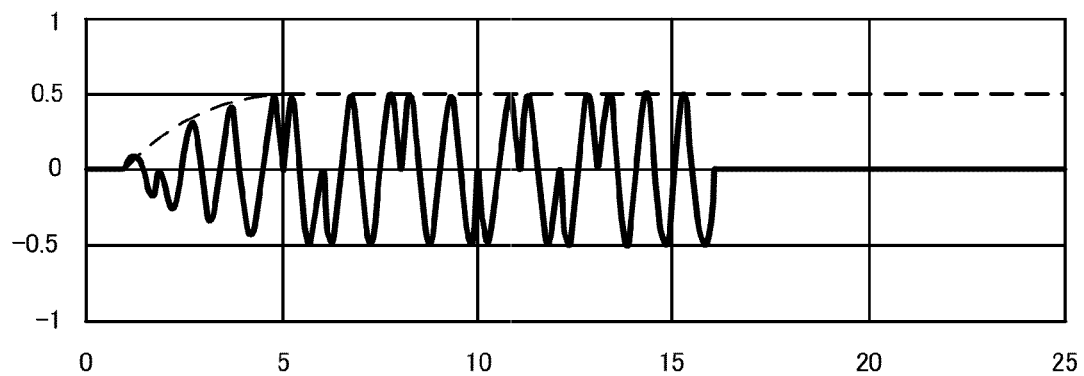
FIG. 8    CURRENT DIRECT WAVE
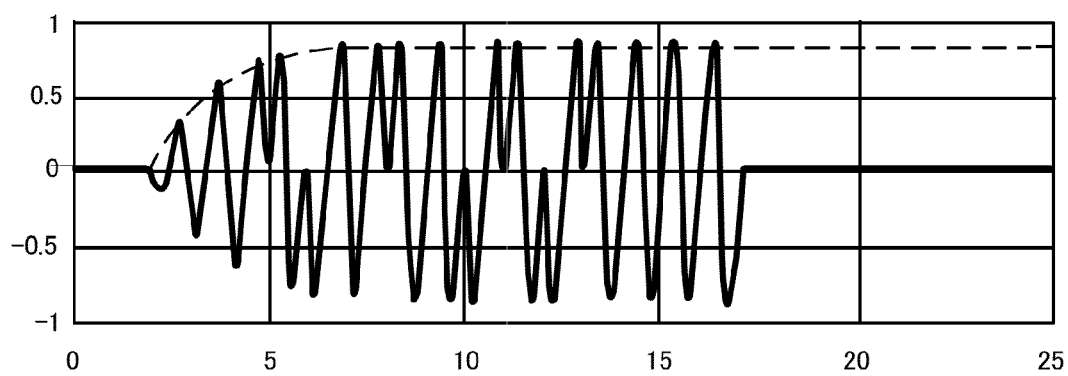

CURRENT REFLECTED WAVE

NOISE WAVEFORM

RECEPTION DEVICE 3

METHOD OF DETERMINING PROPAGATION TIME OF ULTRASONIC FROM MOVABLE BODY AND SYSTEM THEREOF

This application is the National Phase of PCT/JP2008/051225, filed Jan. 28, 2008, which is based upon and claims priority to Japanese Patent Application No. 2007-017211, filed on Jan. 28, 2007 and Japanese Patent Application No. 2008-016381, filed on Jan. 28, 2008, the contents of which are incorporated herein by reference in their entirety.

TECHNICAL FIELD

The present invention relates to a method of determining a propagation time of ultrasonic sent from a movable body to a predetermined position and a system thereof and, more particularly, a technique for determining a position of an electronic pen by using ultrasonic.

BACKGROUND ART

Recited in Patent Literature 1 is one example of related method and system for detecting a position of an electronic pen by using ultrasonic. The position detection system, which comprises an electronic pen having a function of transmitting an ultrasonic signal and an infrared trigger signal of a fixed waveform in a fixed cycle, a receiver for receiving a transmitted signal and software, measures a propagation time of ultrasonic from the electronic pen corresponding to a received trigger signal and determines a position of the electronic pen by using the propagation time. Ultrasonic transmitted from the electronic pen, which is a signal whose waveform is as shown in FIG. 15, is transmitted with the same waveform in a fixed transmission cycle. When receiving an infrared trigger signal, a reception side receives an ultrasonic signal arriving with a delay according to a propagation distance.

Patent Literature 1: U.S. Pat. No. 6,118,205.

While an infrared trigger signal transmitted from an electronic pen has only a direct wave because it arrives at a receiver through a single path, an ultrasonic signal will have a reflected wave because it might reflect on a surrounding wall or the like to arrive at a receiver through a plurality of paths whose propagation distance is different. Therefore, as shown in FIG. 15, the ultrasonic will have not only a direct wave 1 of ultrasonic to be originally detected but also a reflected wave 1. Since the reflected wave 1 has a propagation distance longer than that of the direct wave 1, it arrives at a receiver at $t_3$ immediately before an arrival time $t_4$ of a subsequent direct wave 2. Accordingly, the receiver will detect the ultrasonic signal not at the arrival time $t_4$ but the arrival time point $t_3$ of the reflected wave 1, so that it is impossible to calculate an accurate position of the electronic pen. The first problem of the above-described related art is therefore that when the receiver receives, after receiving an infrared trigger signal, not a direct wave of an ultrasonic signal transmitted simultaneously with the trigger signal but a reflected wave which propagates on a path larger than a path length of a direct wave transmitted in a preceding cycle, it erroneously recognizes the received reflected wave as a direct wave, so that measurement of a propagation time will have an error.

The second problem is that because discrimination between a direct wave and a reflected wave is extremely difficult, when the receiver receives a composite wave with a direct wave and a reflected wave of an ultrasonic signal after receiving a trigger signal, it is difficult to precisely extract a direct wave from the received composite wave.

An object of the present invention is to provide electronic pen position detecting method and system using ultrasonic which eliminate effects of a reflected wave of an ultrasonic signal sent from an electronic pen and enable accurate measurement of a propagation time of a direct wave that arrives fastest in each cycle of the ultrasonic signal sent from an ultrasonic emission source of the electronic pen without being affected by the reflected wave of the ultrasonic signal.

SUMMARY

According to a first exemplary aspect of the invention, a position detection system, comprises at least one mobile body including a transmission device which simultaneously transmits a trigger signal indicative of transmission timing and an ultrasonic signal modulated by pseudo random-sequence data having high self-correlativity in each fixed transmission cycle, and a reception device which receives the trigger signal and the ultrasonic signal to detect a position of the mobile body, wherein the reception device comprises an ultrasonic reception unit which receives the ultrasonic signal, and a data processing unit which generates an ultrasonic model waveform of a pseudo random-sequence of the ultrasonic signal, calculates a correlation value between a waveform of a received ultrasonic signal and the ultrasonic model waveform generated, detects a first peak of the calculated correlation value and calculates an ultrasonic propagation time from a time point of reception of the trigger signal and a time point of detection of the correlation peak, as well as determining a position of the mobile body based on the ultrasonic propagation time calculated.

According to a second exemplary aspect of the invention, a position detection method, wherein a transmission device provided in at least one mobile body executes a step of simultaneously transmitting a trigger signal indicative of transmission timing and an ultrasonic signal modulated by pseudo random-sequence data having high self-correlativity in each fixed transmission cycle, and a reception device which receives the trigger signal and the ultrasonic signal to detect a position of the mobile body executes, a step of receiving the ultrasonic signal, a step of generating an ultrasonic model waveform of a pseudo random-sequence of the ultrasonic signal, a step of calculating a correlation value between a waveform of a received ultrasonic signal and the ultrasonic model waveform generated, a step of detecting a first peak of the calculated correlation value and calculating an ultrasonic propagation time from a time point of reception of the trigger signal and a time point of detection of the correlation peak, and a step of determining a position of the mobile body based on the ultrasonic propagation time calculated.

According to a third exemplary aspect of the invention, a transmission 10 device of a position detection system for detecting a position of the transmission device by receiving, at a reception device, an ultrasonic signal transmitted from the transmission device, comprises a transmission unit which simultaneously sends a trigger signal indicative of transmission timing and an ultrasonic signal modulated by data of a pseudo random-sequence having high self-correlativity in a fixed transmission cycle.

According to a fourth exemplary aspect of the invention, a reception device of a position detection system for detecting a position of a transmission device by receiving, at the reception device, an ultrasonic signal transmitted from the transmission device, comprises a reception unit which receives a trigger signal indicative of transmission timing and an ultrasonic signal modulated by data of a pseudo random-sequence having high self-correlativity which are simultaneously transmitted from the transmission device in a fixed transmission cycle, and a data processing unit which generates an ultrasonic model waveform of a pseudo random-sequence of the ultrasonic signal, calculates a correlation value between a waveform of a received ultrasonic signal and the ultrasonic model waveform generated, detects a first peak of the calculated correlation value and calculates an ultrasonic propagation time from a time point of reception of the trigger signal and a time point of detection of the correlation peak, as well as determining a position of the transmission device based on the ultrasonic propagation time calculated.

The present invention eliminates effects of a reflected wave of an ultrasonic signal sent from an electronic pen to enable accurate measurement of a propagation time of a direct wave that arrives fastest in each cycle of the ultrasonic signal sent from an ultrasonic emission source of the electronic pen without being affected by the reflected wave of the ultrasonic signal.

BRIEF DESCRIPTION OF THE DRAWINGS

FIG. 6 is a diagram showing a composite ultrasonic waveform to be stored in a memory of the reception device according to the present invention;

FIG. 7 is a diagram showing a preceding reflected wave included in the composite waveform shown in FIG. 6;

FIG. 8 is a diagram showing a current direct wave included in the composite waveform shown in FIG. 6;

EXEMPLARY EMBODIMENT

Figure 1:
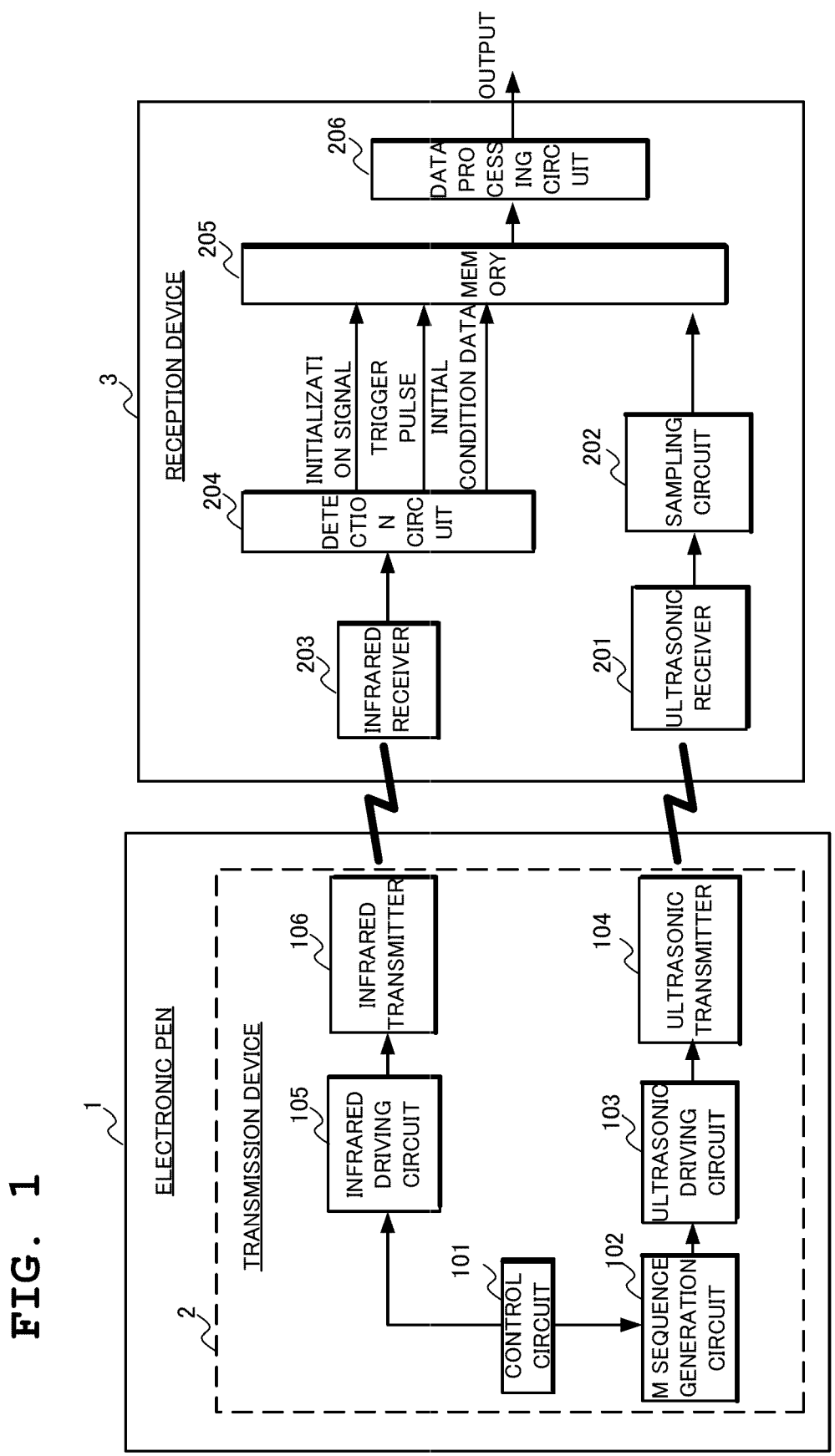
FIG. 1 is a block diagram showing a structure of a transmission device and a reception device according to the present invention.

Next, an exemplary embodiment of the present invention will be detailed with reference to FIG. 1 through FIG. 11. In FIG. 1, an ultrasonic electronic pen position measuring system according to the present invention comprises a transmission device 2 attached to an electronic pen 1, and a reception device 3 disposed at a predetermined position apart from the transmission device.

The transmission device 2 comprises a control circuit 101, an M sequence generation circuit 102, an ultrasonic driving circuit 103, an ultrasonic transmitter 104, an infrared driving circuit 105 and an infrared transmitter 106.

M sequence generated by the M sequence generation circuit 102 is a series generated by a characteristic polynomial, which is obtained by defining a characteristic polynomial and an initial condition. Details of an M-sequence are described in, for example, Hiroshi Kashiwagi, "M-sequence and Its Applications" (Shokodo, Mar. 25,1996).

The control circuit 101 determines an initial condition of an M-sequence in a fixed transmission cycle and transmits the initial condition to the M-sequence generation circuit 102 and the infrared driving circuit 105. The M-sequence generation unit 102 generates an M-sequence coded bit string differing in each transmission cycle according to a predetermined characteristic polynomial and the initial condition. The ultrasonic driving circuit 103 generates a driving signal for ultrasonic modulation from the M-sequence data. The ultrasonic transmitter 104 modulates the ultrasonic with the driving signal as a modulation signal and sends the M-sequence modulated ultrasonic signal into space. Used as a preferred embodiment is a phase modulation system for the modulation of ultrasonic.

On the other hand, the control circuit 101 instructs the infrared driving circuit 105 to generate a trigger signal and subsequently supplies the infrared driving circuit 105 with initial condition data which is obtained by coding the above-described initial condition of the M-sequence. The infrared driving circuit 105 generates an infrared driving signal based on a signal from the control circuit 101. In synchronization with the transmission timing of the ultrasonic transmitter 104, the infrared transmitter 106 is driven by the output of the infrared driving circuit 105 to send an infrared into space through the electronic pen 1.

The control circuit 101 generates an initialization signal at a time point where the electronic pen starts operation and at a time point where transmission of a trigger signal and an ultrasonic signal is executed a predetermined number of times and supplies the infrared driving circuit 105 with the signal to initialize the transmission device 2 and the reception device 3.

The reception device 3 comprises an ultrasonic receiver 201, a sampling circuit 202, an infrared receiver 203, a detection circuit 204, a memory 205 and a data processing circuit 206.

The ultrasonic receiver 201 receives an ultrasonic signal transmitted from the electronic pen 1 and converts the signal into an electric signal and the sampling circuit 202 samples the signal at fixed intervals and stores the same in the memory 205.

The infrared receiver 203 receives an infrared signal from the electronic pen 1 and converts the same into an electronic signal. Upon detection of a trigger pulse from an output of the infrared receiver 203, the detection circuit 204 stores a trigger pulse arrival time in the memory 205 and then detects initial condition data of the M-sequence and stores the same in the memory 205. When the output of the infrared receiver 203 includes initialization data, the detection circuit 204 detects the data and stores the same in the memory 205.

When data indicative of a trigger pulse arrival time is stored in the memory 205, the data processing circuit 206 reads the initial condition data of the M-sequence, generates a model waveform of transmitted ultrasonic from the data and a predetermined characteristic polynomial and executes processing of correlation with an ultrasonic waveform stored in the memory 205 and upon detecting a first peak of a correlation value, calculates a lapse of time from the trigger pulse arrival time until a time point where the peak is detected, that is, a propagation time of the ultrasonic signal from the electronic pen 1 to the reception device 3.

Next, operation of the control circuit 101 of the transmission device 2 will be described with reference to the flow chart of FIG. 2. The electronic pen 1 repeats the following operation in a fixed cycle while it is used to draw a dot or a line. First, when the electronic pen starts operation (Step 301), the control circuit 101 generates an initialization signal (Step 302). The initialization signal is supplied to the infrared driving circuit 105 and transmitted as an infrared from the transmitter 106 (Step 303). Next, the control circuit 101 determines an initial condition of a characteristic polynomial of an M-sequence determined in advance (Step 304). The M-sequence generation circuit 102 generates M-sequence data from the predetermined characteristic polynomial based on the initial condition (Step 305) and supplies the ultrasonic driving circuit 103 with the data (step 306). When determining the M-sequence initial condition, the control circuit 101 also instructs the infrared driving circuit 105 to generate a trigger pulse and M-sequence initial condition data (Step 307). When both driving signals are generated at Steps 306 and 307, the infrared transmitter 106 and the ultrasonic transmitter 104 are driven by both outputs of the infrared driving circuit 105 and the ultrasonic driving circuit 103, whose outputs are simultaneously sent into space through the electronic pen 1 as an infrared and ultrasonic (Step 308).

When Step 308 is executed, the control circuit 101 drives the timer for determining a transmission cycle. Upon detecting a subsequent transmission time point (Step 309), the control circuit 101 determines whether operation of the electronic pen 1 is completed (Step 310) and when it is in operation, proceeds to Step 311 to determine whether transmission of a trigger pulse is executed a predetermined number of times. When the number of execution is not more than the predetermined number, the control circuit 101 returns to Step 304 to determine an initial condition of the characteristic polynomial of the M-sequence determined in advance at a time point of start of a subsequent transmission cycle and repeats the foregoing operation.

When transmission of a trigger pulse is executed the predetermined number of times, the control circuit 101 returns to Step 302 from Step 311 to transmit an initialization signal (Step 303) and repeats the operation at Step 304 and the following steps. When the operation of the electronic pen 1 is completed, the control circuit 101 returns to Step 301 from Step 310.

Figure 3:
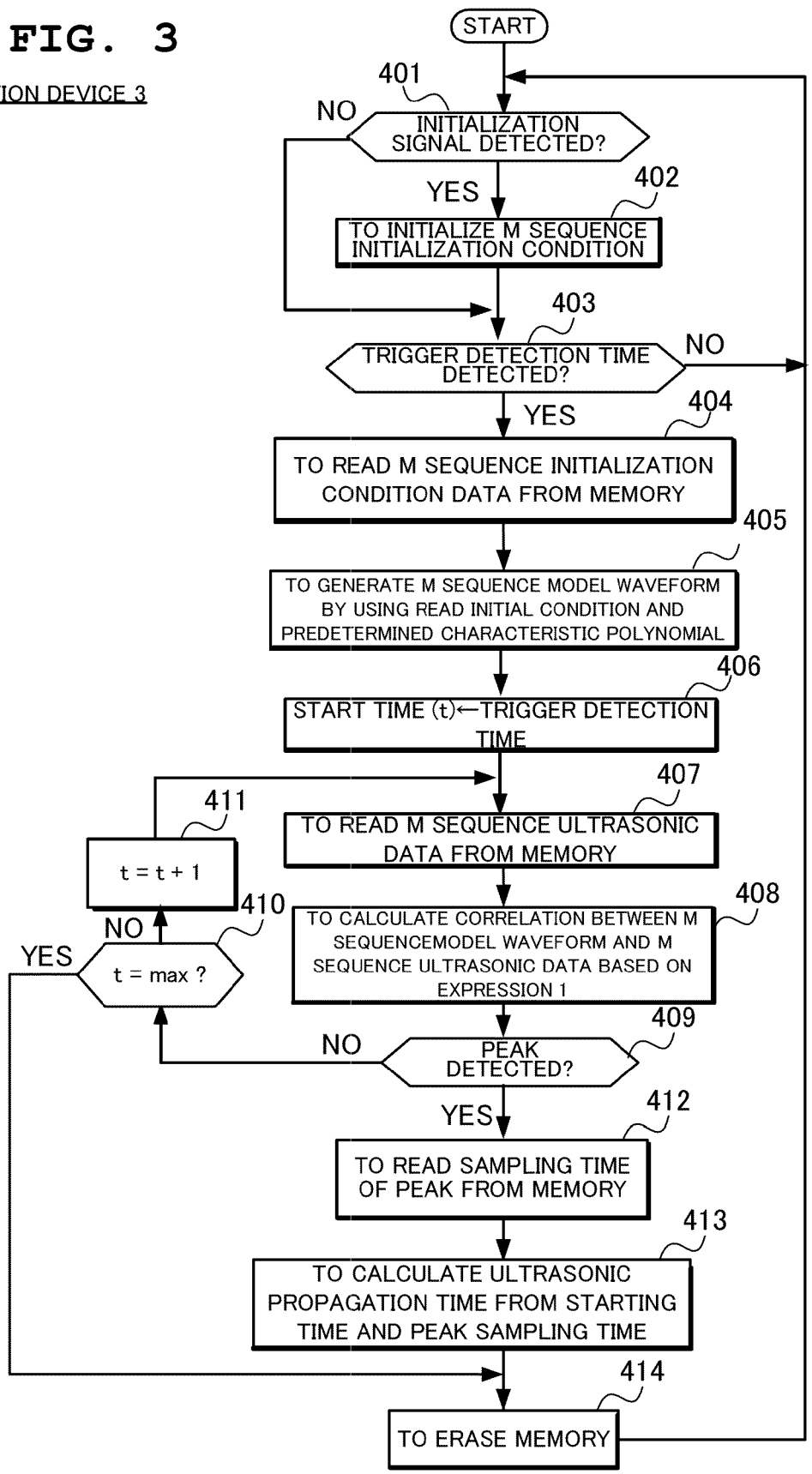
FIG. 3 is a flow chart showing operation of the reception device according to the present invention.

Next, FIG. 3 is a flow chart for use in explaining operation of the data processing circuit 206 of the reception device 3. As a preceding stage of the operation of the data processing circuit 206, the sampling circuit 202 samples a signal received by the ultrasonic receiver 201 at fixed sampling intervals and sequentially stores the sampled waveform data into the memory 205. On the other hand, when detecting an initialization signal from the signal received by the infrared receiver 203, the detection circuit 204 stores the signal into the memory 205 and when subsequently detecting a trigger pulse, generates trigger detection time data and stores the same into the memory 205. Similarly, upon detecting M-sequence initial condition data, the detection circuit 204 stores the data into the memory 205.

In FIG. 3, the data processing circuit 206 searches the memory 205 and when detecting an initialization signal (Step 401), initializes the M-sequence initial condition (Step 402). Next, upon detecting a trigger detection time (Step 403), the data processing circuit 206 reads the M-sequence initial condition data from the memory 205 (Step 404) to generate an M-sequence model waveform of ultrasonic by using the read M-sequence initial condition data and the predetermined characteristic polynomial (Step 405). Next, proceed to Step 406, set a trigger detection time stored in the memory 205 as a sampling start time (t) and read ultrasonic data from the memory 205 (Step 407) to calculate a correlation value C(t) at the sampling time (t) between the read data and the M-sequence model waveform of the ultrasonic previously generated based on a numerical expression(1) (Step 408).
(Numerical Expression 1)

In the expression 1, i is an integral value which represents a sampling time as a variable, N represents the number of samplings of a model waveform, r(i) represents a value of a model waveform at a sampling time i, and f(i+t) represents a value of a waveform at a sampling time (i+t).

Search the correlation value obtained at Step 409 for a peak. When no peak is detected, proceed to Step 410 and when the sampling time (t) fails to reach a predetermined maximum value (Max), proceed to Step 411 to increment the sampling time t by a unit amount of 1 and return to Step 407. When a correlation peak is detected at Step 409 by successive execution of Steps 407 through Step 411, read from the memory 205 a sampling start time corresponding to the variable t at a time point of the detection of the correlation peak (Step 412).

The data processing circuit 206 calculates time of ultrasonic propagation from the electronic pen 1 from the starting time set at Step 406 and the peak sampling time detected at Step 412 (Step 413). The data processing circuit 206 further determines a position of the electronic pen 1 from the propagation time and outputs the same to an external circuit and when erasing the memory 205 at Step 414, returns to Step 401.

With a sampling time at which a trigger pulse is received as 0 and a sampling cycle as T, an ultrasonic propagation time will be calculated as t×T.

When no peak is detected at Step 409 for some reason or another, the time t attains a predetermined maximum value at Step 410 to proceed to Step 414, where the memory 205 is erased to return to Step 401.

Next, a specific example of the present invention will be described with reference to FIG. 4 through FIG. 11. M-sequence is a series generated by a characteristic polynomial, from which a specific data string is obtained by defining a characteristic polynomial and an initial condition. Used here is a data string whose series length is 15 bits which is generated by a quartic characteristic polynomial (fx) $=x^4+x+1$ in the following expression 1. By changing an initial condition, 15 different data strings can be obtained whose data arrangement is cyclically shifted.

The control circuit 101 determines an initial condition of an M-sequence in a fixed cycle (e.g. 50 Hz) and notifies the M-sequence generation circuit 102 and the infrared driving circuit 105 of the same. Initial condition of an M-sequence is cyclically determined so as to obtain 15 kinds of data strings in 15 cycles. For the sake of convenience, it is possible to assign numbers 1 to 15 to 15 kinds of data strings and designate the number. In addition, although it is unnecessary for an initial condition of an M-sequence to designate all of the 15 data strings, because an ultrasonic signal attenuates along a propagation distance, the condition needs to be set taking into consideration a possibility how many preceding cycles of an ultrasonic signal the reception device 3 might possibly receive. In a case, for example, where the device might receive ultrasonic signals up to those in three preceding cycles, it should be set such that at least four different kinds of data strings are obtained.

The M-sequence generation circuit 102 generates 15-bit M-sequence data according to an initial condition of an M-sequence which is designated by the control circuit 101. M-sequence data may be generated each time according to a given initial condition, or with a data string of an M-sequence stored in advance, a data string of the M-sequence corresponding to a designated initial condition may be selected.

Figure 4:
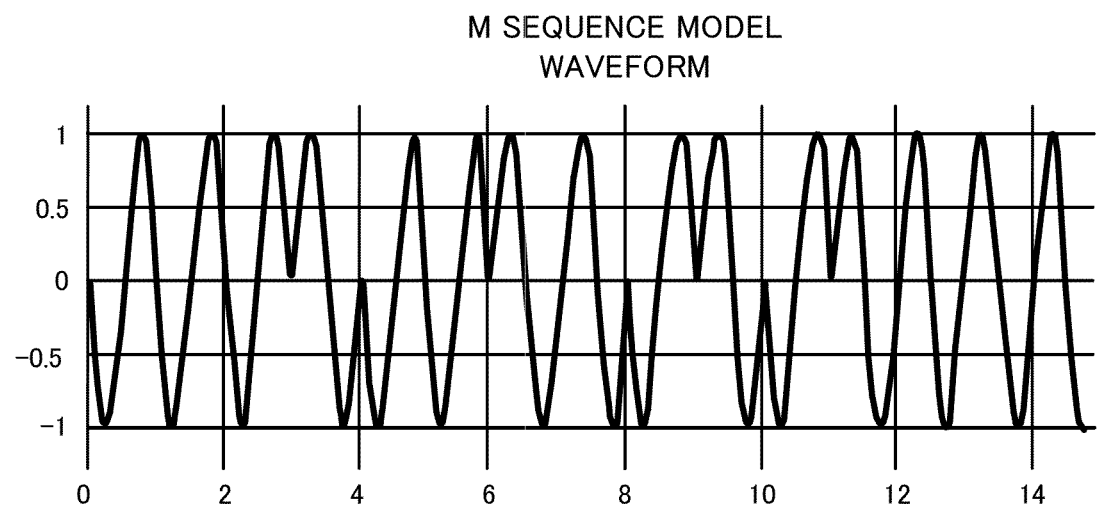
FIG. 4 is a diagram showing an M sequence model waveform generated by the reception device according to the present invention.

FIG. 4 shows an M-sequence model waveform of ultrasonic having a frequency of 40 kHz whose phase is modulated by the M-sequence. Each one bit of the 15-bit M-sequence data "0001001 10101111" corresponds to one cycle of a fundamental wave. With 0 as an inverse phase and 1 as a right phase, a modulated wave will have a length of 15 cycles of the fundamental wave.

Figure 5:
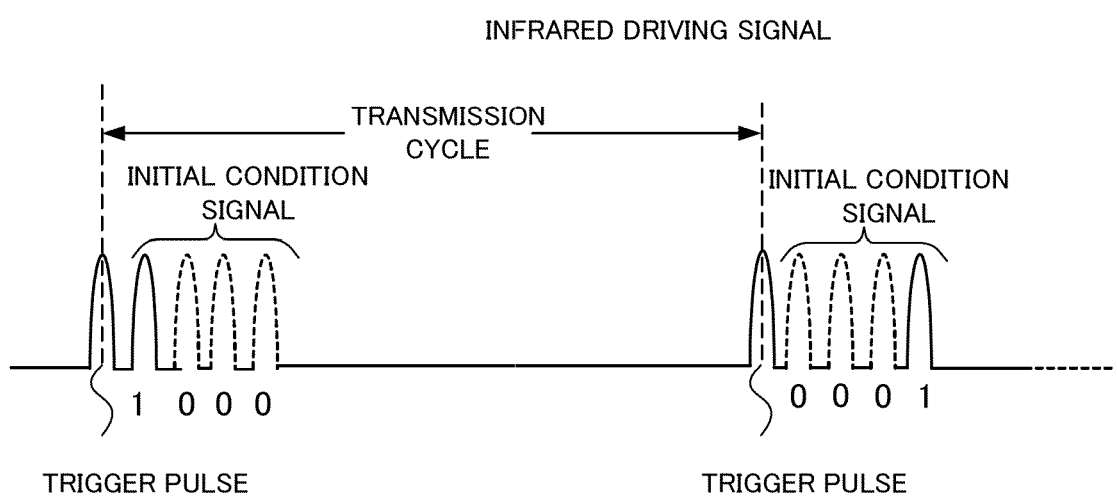
FIG. 5 is a diagram showing a waveform of an infrared driving signal generated by the transmission device according to the present invention.

As shown in FIG. 5, the infrared driving signal is a signal indicative of an initial condition of an M-sequence of a pulse signal succeeding a pulse as a trigger and shown is an example where "1000" is transmitted by the first transmission and "0001" is transmitted by the second transmission.

The ultrasonic signal received by the ultrasonic receiver 201 is sampled at the sampling intervals T and stored in the memory 205. Filtering processing is executed as required for the purpose of noise removal.

FIG. 6 shows a waveform of the ultrasonic stored in the memory 205. It is a composite wave formed of a direct wave, a reflected wave and a noise waveform of the transmitted ultrasonic. Shown is a waveform obtained when the sampling interval is one-eighth of the fundamental waveform cycle of the ultrasonic. The abscissa represents time with a time point of the reception of the infrared trigger pulse as 0. In a case of ultrasonic whose frequency is 40 kHz, the cycle will be 25 ms and the sampling interval will be 3.125 ms.

Figure 9:
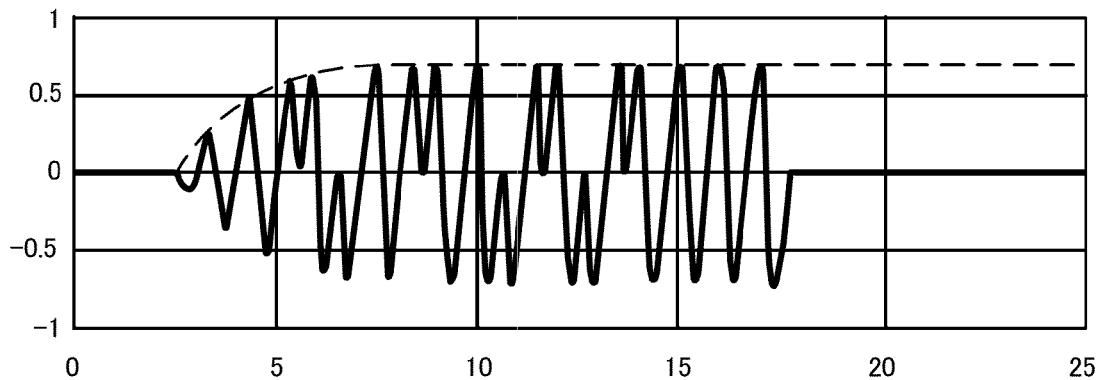
FIG. 9 is a diagram showing a current reflected wave included in the composite waveform shown in FIG. 6.
Figure 10:
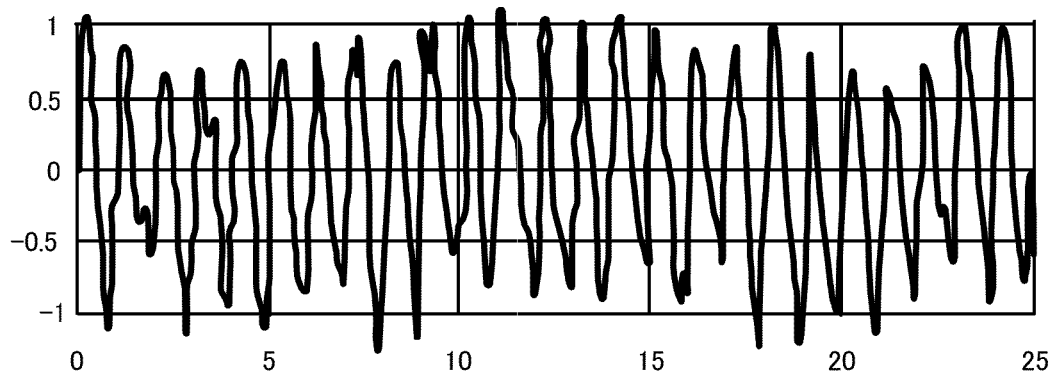
FIG. 10 is a diagram showing a noise waveform included in the composite waveform shown in FIG. 6.

FIG. 7 shows a waveform of a reflected wave of transmitted ultrasonic in a preceding cycle of the ultrasonic whose phase is modulated by the 15-bit M-sequence data string "100010011010111", which is included in the composite waveform shown in FIG. 6. FIG. 8 shows a waveform of a direct wave of transmitted ultrasonic in the current cycle, which is also included in the composite waveform. FIG. 9 shows a waveform of a reflected wave of the transmitted ultrasonic in the current cycle. Its phase is the same as that of the direct wave shown in FIG. 8. FIG. 10 shows a noise waveform.

Figure 11:
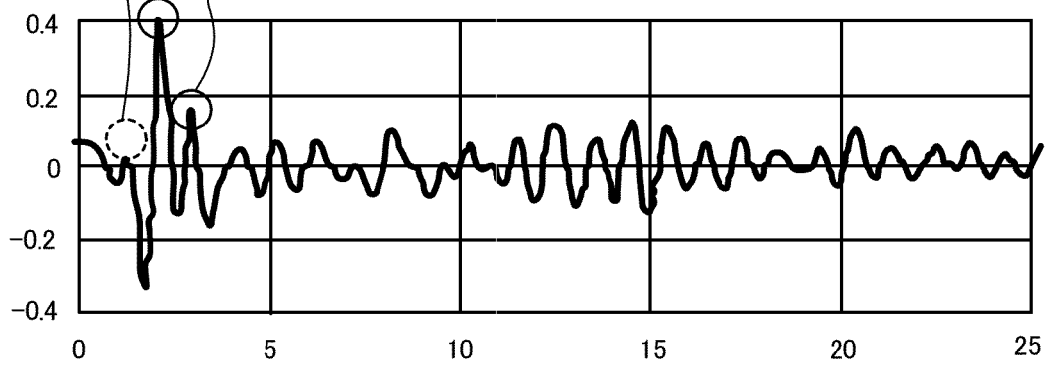
FIG. 11 is a diagram showing a correlation value calculated by a data processing unit of the present invention.

The data processing circuit 206 correlates the composite wave shown in FIG. 6 and the model waveform shown in FIG. 4. FIG. 11 is a correlation value graph obtained by plotting the correlation value. A peak of the current direct wave appears first and a preceding reflected wave arriving time point fails to appear as a peak because of an M-sequence whose initial value is different. Thus, since arrival time of a direct wave of an ultrasonic signal is determined based on a first correlation value peak, even when the wave overlaps with the reflected wave, it can be detected precisely.

Figure 12:
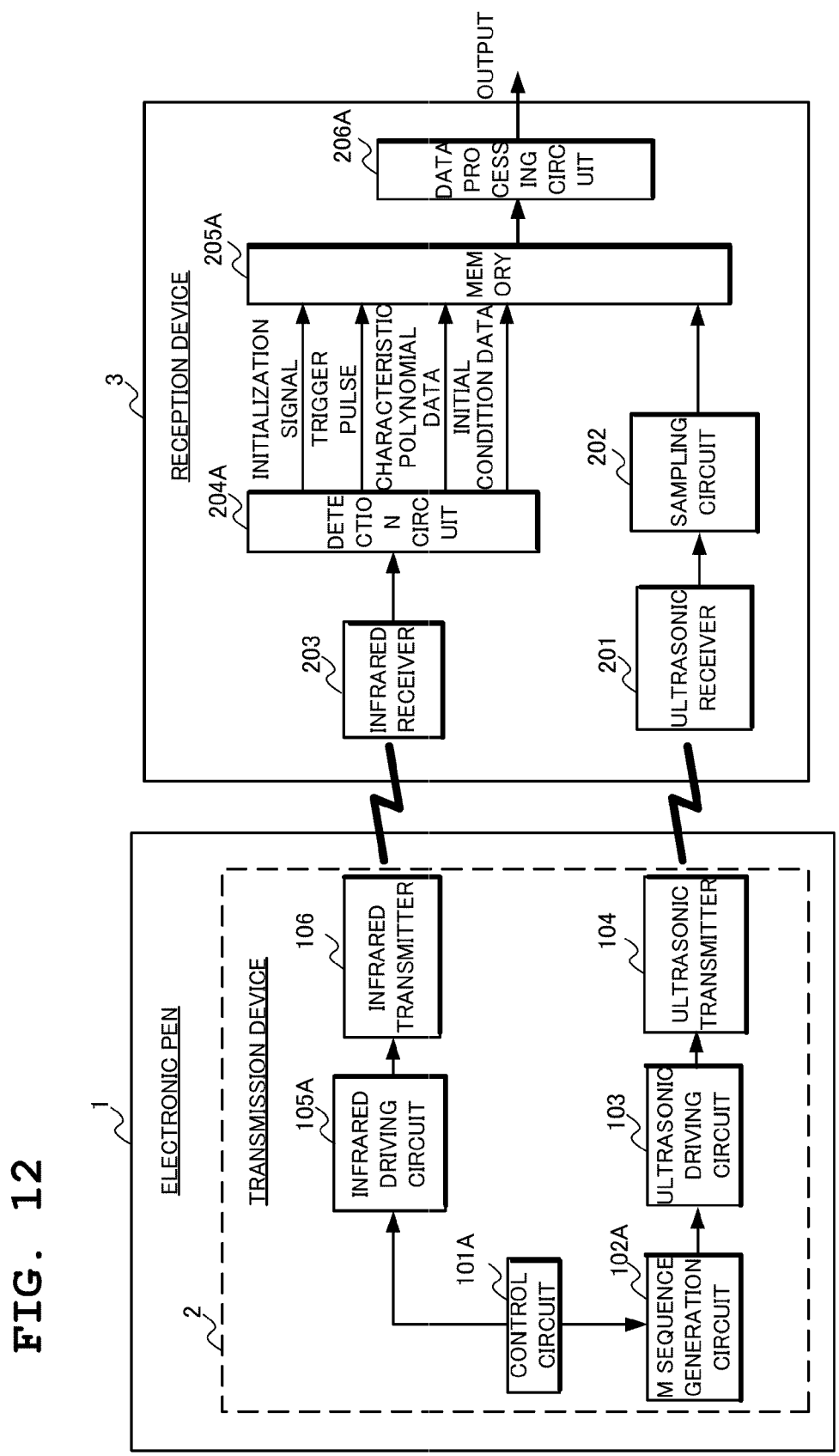
FIG. 12 is a block diagram showing a modification example of the transmission device and the reception device shown in FIG. 1.

While the characteristic polynomial in FIG. 1 is determined in advance, FIG. 12 shows a modification example of the transmission device 2 and the reception device 3 using a characteristic polynomial differing in each transmission cycle. In FIG. 12, a part corresponding to that in FIG. 1 is given the same reference numeral to omit its description.

A control circuit 101A of the transmission device 2 determines, successively to an initialization signal and a trigger signal in each transmission cycle, a characteristic polynomial of an M-sequence and an initial condition in each transmission cycle. Successively to generation of an initialization signal and a trigger pulse, an infrared driving circuit 105A generates designated M-sequence characteristic polynomial and initial condition data string to drive the infrared transmitter 106. An M-sequence generation circuit 102A generates M-sequence data based on the characteristic polynomial and the initial condition designated by the control circuit 101A. It is also possible to make a combination of a plurality of M-sequence characteristic polynomials and a plurality of M-sequence initial conditions into a table together with combination numbers and transmit only a combination number.

A detection circuit 204A of the reception device 3 detects an initialization signal, a trigger pulse, M-sequence characteristic polynomial data and M-sequence initial condition data and stores the same in the memory 205. Upon reading characteristic polynomial data and initial condition data from the memory 205, a data processing circuit 206A generates an M-sequence model waveform of ultrasonic based on these data.

In a case where a combination of a plurality of M-sequence characteristic polynomials and a plurality of M-sequence initial conditions is made into a table as described above, the reception device 3 has a table indicative of a combination of a plurality of M-sequence characteristic polynomials and a plurality of M-sequence initial conditions. When detecting a combination number, the data processing circuit 206A searches the table to detect corresponding characteristic polynomial data and initial condition data.

Figure 2:
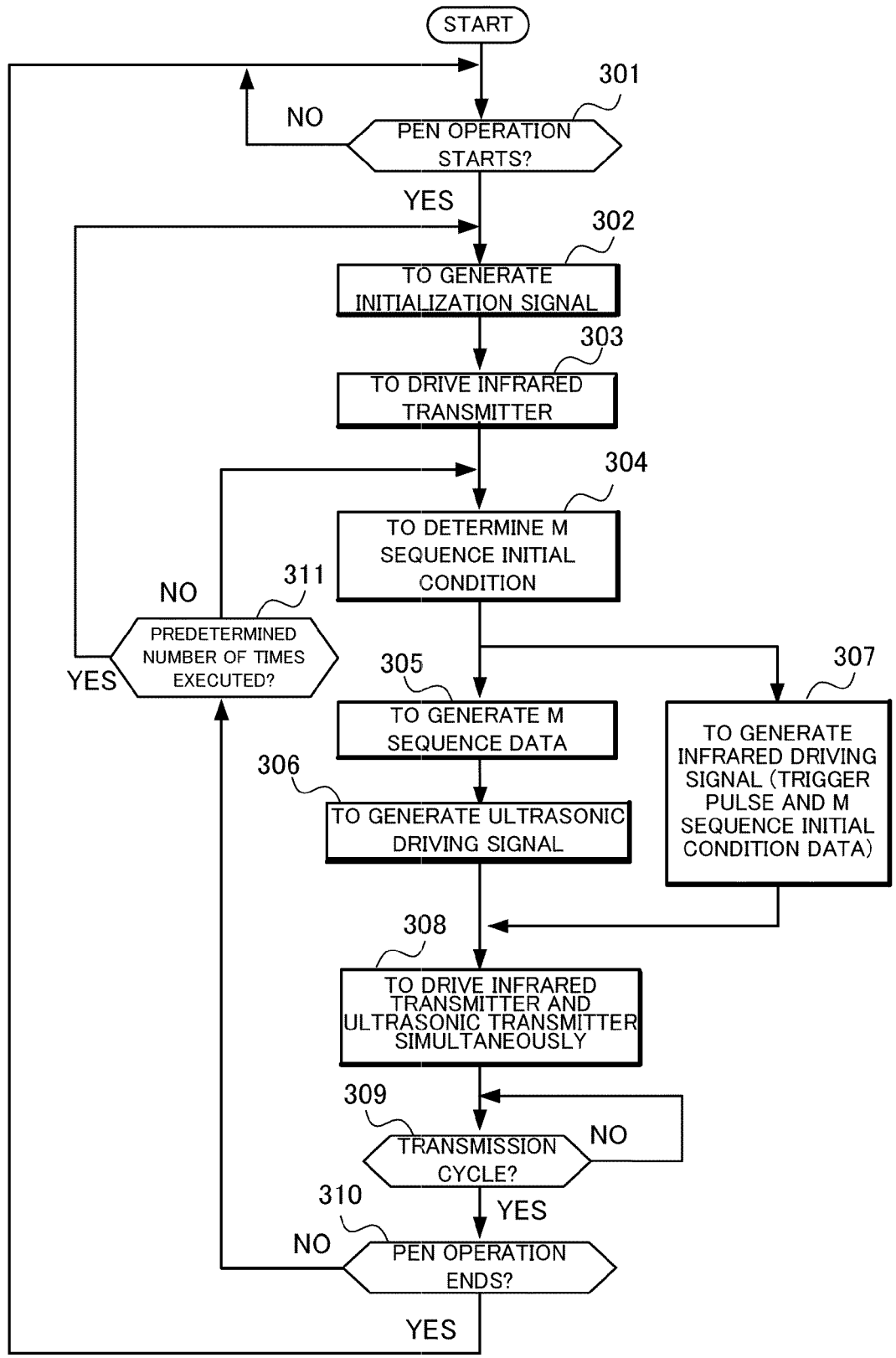
FIG. 2 is a flow chart showing operation of the transmission device according to the present invention.
Figure 13:
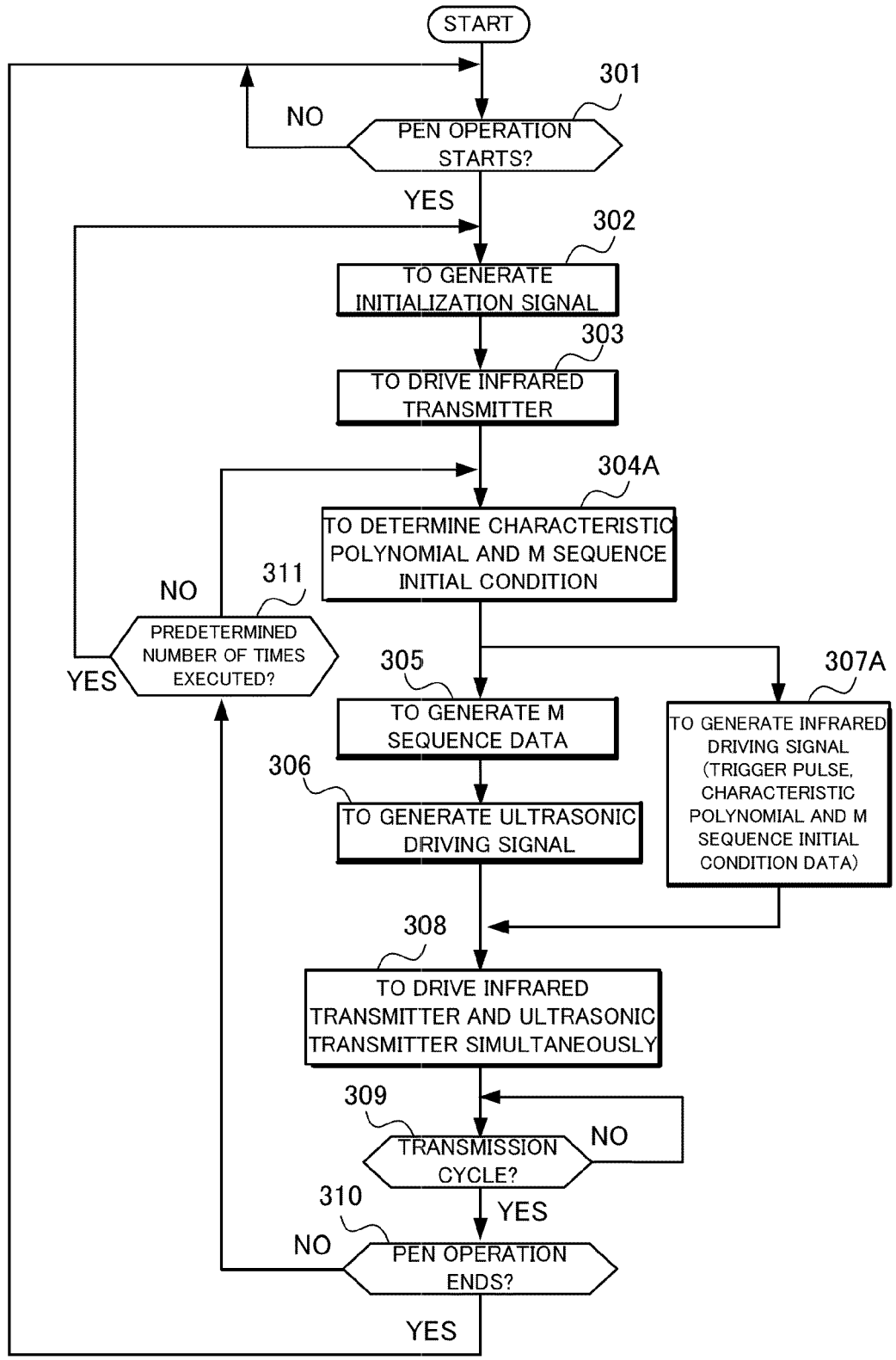
FIG. 13 is a flow chart showing operation of the transmission device shown in FIG. 12.

FIG. 13 is a flow chart showing operation of the control circuit 101A, in which a step corresponding to that in FIG. 2 is denoted by the same reference numeral to omit its description. In FIG. 13, the control circuit 101A determines an M-sequence characteristic polynomial and an M-sequence initial condition at Step 304A and generates a trigger pulse, M-sequence characteristic polynomial data and M-sequence initial condition data at Step 307A.

Figure 14:
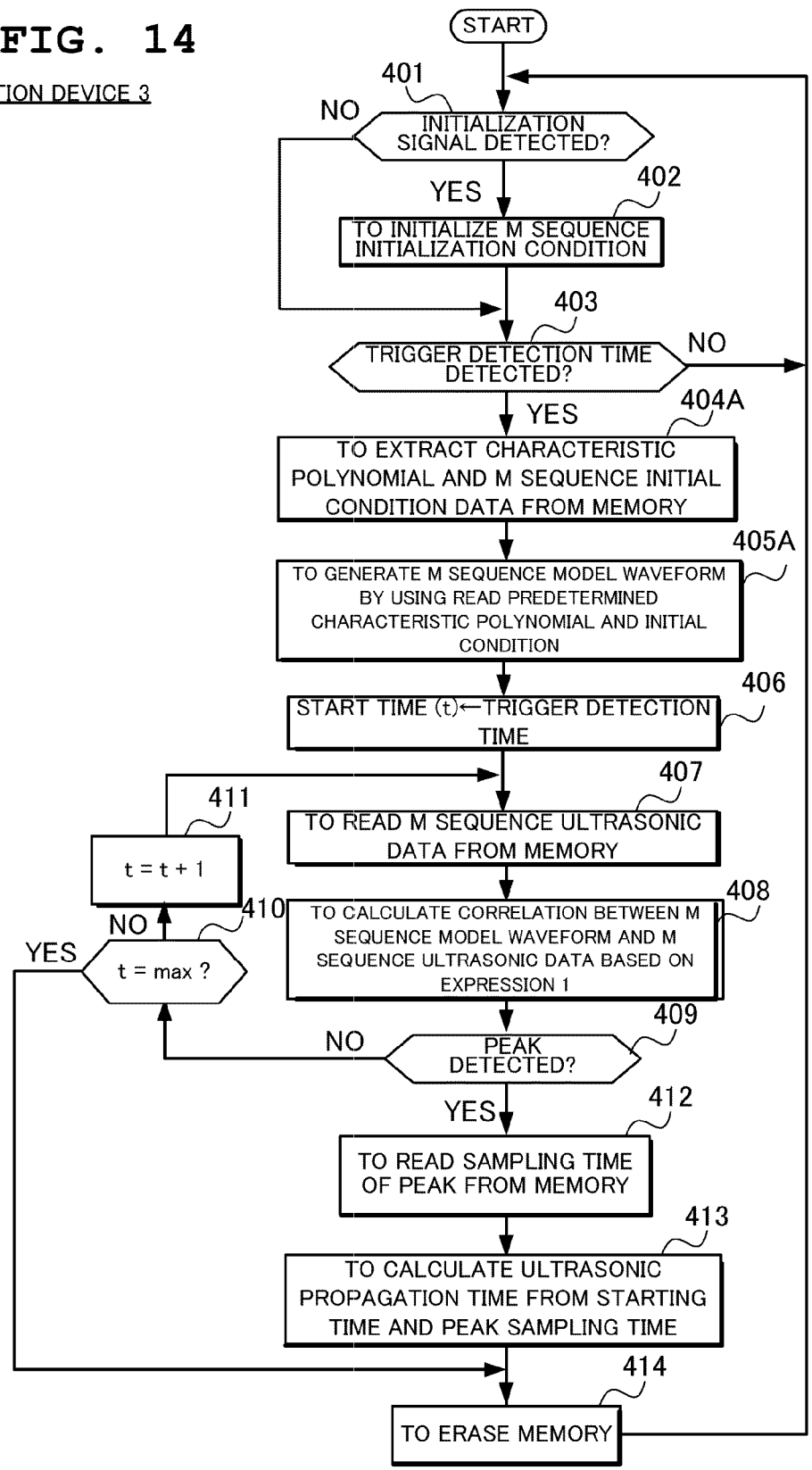
FIG. 14 is a flow chart showing operation of the reception device shown in FIG. 12.
Figure 15:
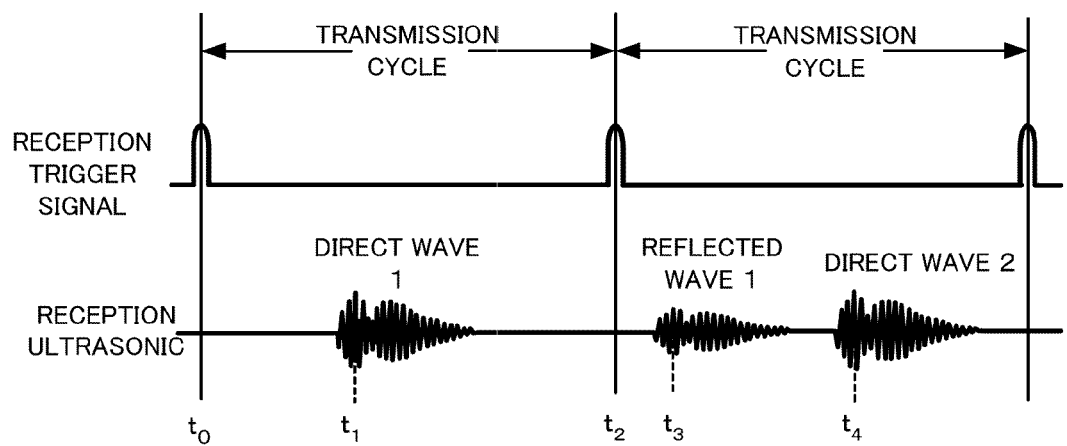
FIG. 15 is a diagram showing an example of related reception trigger signal and ultrasonic waveform.

FIG. 14 is a flow chart showing operation of the data processing circuit 206A, in which a step corresponding to that in FIG. 3 is denoted by the same reference numeral to omit its description. In FIG. 14, the data processing circuit 206A reads M-sequence characteristic polynomial data and M-sequence initial condition data at Step 404A and generates an M-sequence model waveform by using the read characteristic polynomial data and initial condition data at Step 405A.

When the characteristic polynomial data and the initial condition data are mapped, it is only necessary to transmit a mapping number, easiness of which enables structures of the transmission device and the reception device to be simplified and the volume of transmission data to be reduced.

Initializing the transmission device and the reception device by an initialization signal and after initialization, changing M-sequence data by the same rule by the transmission device and the reception device at every transmission and reception of a reception trigger eliminates the need of transmission of data of an M-sequence characteristic polynomial or an initial condition, so that it is only necessary to transmit a trigger signal, which enables simplification of structures of the transmission device and the reception device and reduction in the volume of transmission data.

Another possible exemplary embodiment is a method using an M-sequence reception trigger pulse signal as a reception trigger signal. In this case, the detection circuit 204 of the reception device 3 detects a reception trigger pulse signal arrival time by executing correlation processing by an M-sequence model waveform. In this case, erroneous operation of a trigger signal caused by noise can be prevented.

The foregoing description is not limited to use of one electronic pen but applicable to use of a plurality of electronic pens. To a plurality of electronic pens 1, a different M-sequence is assigned to each electronic pen. In other words, an M-sequence selected by the control circuit 101 or the control circuit 101A is set to each electronic pen so as not to overlap with each other.

In a case, for example, where ultrasonic signals up to those in two preceding cycles might be received, since at least three different data strings should be obtained for each electronic pen, 15 data strings are divided into five groups each for three strings, each of which groups is assigned to each of the five electronic pens. Also assume that an infrared signal transmitted from the infrared transmitter 106 is a signal which can be identified for each electronic pen. In the reception device 3, when an infrared receiver 203 receives an infrared signal and the detection circuit 204 detects a trigger pulse corresponding to each electronic pen from an output of the infrared receiver 203, the circuit stores a trigger pulse arrival time in the memory 205. Execution of correlation processing with respect to an ultrasonic waveform by a generated M-sequence model waveform enables the data processing circuit 206 to detect an ultrasonic arrival time of the relevant electronic pen as a peak of a correlation value of the M-sequence.

A further possible exemplary embodiment is a method using an infrared signal of the same wavelength as a reception trigger signal and using a reception trigger pulse signal of an M-sequence differing for each electronic pen 1.

In this case, the detection circuit 204 of the reception device 3 detects a reception trigger pulse signal arrival time by executing correlation processing by an M-sequence model waveform for each electronic pen 1. In this case, by using an M-sequence having a larger bit length and changing a pulse width for each electronic pen 1, degradation of detection precision when a pulse signal of each electronic pen 1 overlaps with each other can be prevented.

While the present invention has been described with respect to the preferred mode of implementation and exemplary embodiment in the foregoing, the present invention is not necessarily limited to the above-described preferred mode of implementation and exemplary embodiment but can be implemented in various modifications without departing from the scope of its technical idea.

While the foregoing description has been made with respect to an electronic pen as an example, the present invention is applicable also to a movable body such as a robot. More specifically, disposing the transmission device 2 in a robot and disposing the reception device 3 on a ceiling or a wall in a certain space enables detection of a position of the robot in the space. Seizing a position of the robot in the space to control the robot allows such use for avoiding collision. On the other hand, by attaching the transmission device 2 to a human body or the like and disposing the reception device 3 on a ceiling or a wall in a certain space allows such use for traffic line detection or position tracing in the space.

In addition, while the description has been made of modulation by an M-sequence, it is not limited to an M-sequence as long as the signal is a pseudo random signal having high self-correlativity and low cross-correlation with other series such as a Gold series, for example.

What is claimed is:

1. A position detection system, comprising:
   at least one mobile body including a transmission device which simultaneously transmits a trigger signal indicative of transmission timing and an ultrasonic signal modulated by pseudo random-sequence data having high self-correlativity in each fixed transmission cycle, and
   a reception device which receives said trigger signal and said ultrasonic signal to detect a position of said mobile body, wherein said reception device comprises:
   an ultrasonic reception unit which receives said ultrasonic signal, and
   a data processing unit which generates an ultrasonic model waveform of a pseudo random-sequence of said ultrasonic signal, calculates a correlation value between a waveform of a received ultrasonic signal and said ultrasonic model waveform generated, detects a first peak of the calculated correlation value and calculates an ultrasonic propagation time from a time point of reception of said trigger signal and a time point of detection of the correlation peak, as well as determining a position of said mobile body based on said ultrasonic propagation time calculated,
   wherein said transmission device transmits said ultrasonic signal, and an electromagnetic wave signal including said trigger signal and data which defines said pseudo random-sequence in each fixed transmission cycle, and
   wherein said pseudo random-sequence is an M-sequence and data defining said pseudo random-sequence which said electromagnetic wave signal includes is M-sequence initial condition data.

2. The position detection system according to claim 1, wherein
   said data processing unit of said reception device generates said ultrasonic model waveform of said ultrasonic signal by using data defining a pseudo random-sequence which said electromagnetic wave signal received includes.

3. The position detection system according to claim 1, wherein
   said trigger signal is an electromagnetic wave signal modulated by a pseudo random signal having high self-correlativity, and
   said data processing unit of said reception device calculates a correlation value between a waveform of a received trigger signal and a modulation reference waveform set in advance and detects a top of said trigger signal to generate timing as a start point of an arrival time of the ultrasonic signal.

4. The position detection system according to claim 1, wherein
   said transmission device comprises an electromagnetic wave transmission unit which determines an M-sequence initial condition in each transmission cycle to transmit an electromagnetic wave signal including a trigger signal indicative of transmission timing and data indicative of the M-sequence initial condition, and
   an ultrasonic transmission unit which generates an M-sequence waveform based on an M-sequence initial condition determined in each said transmission cycle to transmit an ultrasonic signal of an M-sequence waveform simultaneously with said electromagnetic wave signal, and
   said reception device comprises a detection unit which detects said trigger signal and data indicative of said M-sequence initial condition from said electromagnetic wave signal received, and
   a storage unit which stores data indicative of an M-sequence initial condition of said detection unit and said ultrasonic signal received, wherein said data processing unit reads data indicative of said M-sequence initial condition from said storage unit to generate an ultrasonic model waveform modulated by an M-sequence, and said unit which calculates the correlation value sequentially reads an ultrasonic signal stored in said storage unit to calculate a correlation value between the read signal and an ultrasonic model waveform modulated by said M-sequence.

5. The position detection system according to claim 4, wherein said electromagnetic wave transmission unit changes said M-sequence initial condition in each said transmission cycle, and said data processing unit generates an ultrasonic model waveform modulated by said M-sequence based on the changed M-sequence initial condition at every reception of said trigger signal.

6. The position detection system according to claim 4, wherein said electromagnetic wave transmission unit determines said M-sequence initial condition whose predetermined characteristic polynomial is different in each said transmission cycle and transmits an electromagnetic wave signal including data indicative of the determined M-sequence initial condition, and said data processing unit generates an ultrasonic model waveform modulated by said M-sequence based on said predetermined characteristic polynomial and M-sequence initial condition data detected from a received electromagnetic wave signal.

7. The position detection system according to claim 4, wherein said electromagnetic wave transmission unit transmits an electromagnetic wave signal including data indicative of different M-sequence initial conditions and data indicative of different characteristic polynomials in each said transmission cycle, said detection unit detects a characteristic polynomial from a received electromagnetic wave signal and stores the polynomial in said storage unit, and said data processing unit generates an ultrasonic model waveform modulated by said M-sequence based on data indicative of said M-sequence initial condition detected from a received electromagnetic wave signal and said characteristic polynomial data.

8. The position detection system according to claim 4, wherein said electromagnetic wave transmission unit transmits an electromagnetic wave signal including data which defines an M-sequence differing in each said transmission cycle, and said data processing unit generates an ultrasonic model waveform modulated by said M-sequence based on M-sequence characteristic polynomial data and initial condition data corresponding to data defining said M-sequence that said electromagnetic wave signal received includes.

9. The position detection system according to claim 1, wherein said ultrasonic transmission unit sends said ultrasonic signal whose phase is modulated by said M-sequence data.

10. The position detection system according to claim 1, wherein said electromagnetic wave transmission unit is an infrared transmitter.

11. The position detection system according to claim 1, wherein said electromagnetic wave transmission unit transmits an electromagnetic wave signal including an initialization signal at every predetermined number of transmissions of said electromagnetic wave signal, and said data processing unit initializes said M-sequence initial condition based on an initialization signal which said electromagnetic wave signal received includes.

12. The position detection system according to claim 1, wherein said data processing unit samples a received ultrasonic signal in a fixed sampling cycle and stores the obtained signal in said storage unit, sets data indicative of a time point of reception of said trigger signal as a variable indicative of a starting time point of said correlation value calculation, reads a waveform of each sampled ultrasonic signal from said storage unit to calculate a value of correlation between a waveform of said ultrasonic signal sampled and an ultrasonic model waveform modulated by said M-sequence, searches a plurality of sequentially calculated correlation values for a first correlation value peak, when no correlation value peak is detected, increments said variable by a unit amount to read a subsequent sampled ultrasonic signal from said storage unit and calculate a value of correlation between a waveform of the ultrasonic signal and an ultrasonic model waveform modulated by said M-sequence, and when said first correlation value peak is detected, calculates a propagation time of said ultrasonic signal from a time point corresponding to a value of said variable and a time point of reception of said trigger signal.

13. The position detection system according to claim 1, wherein said mobile body is an electronic pen.

14. The position detection system according to claim 1, wherein said mobile body is a robot.

15. A position detection method comprising:

simultaneously transmitting, by a transmission device of a mobile body, a trigger signal indicative of transmission timing and an ultrasonic signal modulated by pseudo random-sequence data having high self-correlativity in each fixed transmission cycle;

receiving, by a reception device, said trigger signal and said ultrasonic signal to detect a position of said mobile body;

generating, by said reception device, an ultrasonic model waveform of a pseudo random-sequence of said received ultrasonic signal;

calculating, by said reception device, a correlation value between a waveform of said received ultrasonic signal and said ultrasonic model waveform generated, detecting, by said reception device, a first peak of the calculated correlation value and calculating an ultrasonic propagation time from a time point of reception of said trigger signal and a time point of detection of the correlation peak, and determining, by said reception device, a position of said mobile body based on said ultrasonic propagation time calculated, wherein said transmission device transmits said ultrasonic signal, and an electromagnetic wave signal including said trigger signal and data defining said pseudo random-sequence in each fixed transmission cycle, and wherein said pseudo random-sequence is an M-sequence and data defining said pseudo random-sequence which said electromagnetic wave signal includes is M-sequence initial condition data.

16. The position detection method according to claim 15, wherein
said reception device generates said ultrasonic model waveform of said ultrasonic signal by using data defining a pseudo random-sequence which said electromagnetic wave signal received includes.

17. The position detection method according to claim 15, wherein
said trigger signal is an electromagnetic wave signal modulated by a pseudo random signal having high self-correlativity, and
said reception device calculates a correlation value between a waveform of a received trigger signal and a modulation reference waveform set in advance and detects a top of the trigger signal to generate timing as a start point of an arrival time of the ultrasonic signal.

18. The position detection method according to claim 15, wherein said transmission device executes
a step of determining an M-sequence initial condition in each transmission cycle to transmit an electromagnetic wave signal including a trigger signal indicative of transmission timing and data indicative of the M-sequence initial condition, and
a step of generating an M-sequence waveform based on an M-sequence initial condition determined in each said transmission cycle to transmit an ultrasonic signal of an M-sequence waveform simultaneously with said electromagnetic wave signal, and said reception device executes
a step of detecting said trigger signal and the data indicative of said M-sequence initial condition from said electromagnetic wave signal received,
a step of storing data indicative of said detected M-sequence initial condition and said ultrasonic signal received in a storage unit,
a step of reading data indicative of said M-sequence initial condition from said storage unit to generate an ultrasonic model waveform modulated by an M-sequence, and
a step of sequentially reading an ultrasonic signal stored in said storage unit to calculate a correlation value between the read signal and an ultrasonic model waveform modulated by said M-sequence.

19. The position detection method according to claim 18, wherein
said transmission device changes said M-sequence initial condition in each said transmission cycle, and
said reception device generates an ultrasonic model waveform modulated by said M-sequence based on the changed M-sequence initial condition at every reception of said trigger signal.

20. The position detection method according to claim 18, wherein
said transmission device determines said M-sequence initial condition whose predetermined characteristic polynomial is different in each said transmission cycle and transmits an electromagnetic wave signal including data indicative of the determined M-sequence initial condition, and
said reception device generates an ultrasonic model waveform modulated by said M-sequence based on said predetermined characteristic polynomial and M-sequence initial condition data detected from a received electromagnetic wave signal.

21. The position detection method according to claim 18, wherein said transmission device transmits an electromagnetic wave signal including data indicative of different M-sequence initial conditions and data indicative of different characteristic polynomials in each said transmission cycle, and said reception device generates an ultrasonic model waveform modulated by said M-sequence based on data indicative of said M-sequence initial condition detected from a received electromagnetic wave signal and said characteristic polynomial data.

22. The position detection method according to claim 18, wherein
said transmission device sends an electromagnetic wave signal including data which defines an M-sequence differing in each said transmission cycle, and said reception device generates an ultrasonic model waveform modulated by said M-sequence based on M-sequence characteristic polynomial data and initial condition data corresponding to data defining said M-sequence that said electromagnetic wave signal received includes.

23. The position detection method according to claim 15, wherein
said transmission device sends said ultrasonic signal whose phase is modulated by said M-sequence data.

24. The position detection method according to claim 15, wherein
said transmission device transmits an electromagnetic wave signal including an initialization signal at every predetermined number of transmissions of said electromagnetic wave signal, and said reception device initializes said M-sequence initial condition based on an initialization signal which said electromagnetic wave signal received includes.

25. The position detection method according to claim 15, wherein said reception device
samples a received ultrasonic signal in a fixed sampling cycle and stores the obtained signal in said storage unit,
sets data indicative of a time point of reception of said trigger signal as a variable indicative of a starting time point of said correlation value calculation,
reads a waveform of each sampled ultrasonic signal from said storage unit to calculate a value of correlation between a waveform of said ultrasonic signal sampled and an ultrasonic model waveform modulated by said M-sequence,
searches a plurality of sequentially calculated correlation values for a first correlation value peak,
when no correlation value peak is detected, increments said variable by a unit amount to read a subsequent sampled ultrasonic signal from said storage unit and calculate a value of correlation between a waveform of the ultrasonic signal and an ultrasonic model waveform modulated by said M-sequence, and when said first correlation value peak is detected, calculates a propagation time of said ultrasonic signal from a time point corresponding to a value of said variable and a time point of reception of said trigger signal.

26. The position detection method according to claim 15, wherein said mobile body is an electronic pen.

27. The position detection method according to claim 15, wherein said mobile body is a robot.

28. A transmission device of a position detection system for detecting a position of said transmission device by receiving, at a reception device, an ultrasonic signal transmitted from said transmission device, comprising:
a transmission unit which simultaneously sends a trigger signal indicative of transmission timing and an ultrasonic signal modulated by data of a pseudo random-sequence having high self-correlativity in a fixed transmission cycle, wherein said transmission unit transmits an electromagnetic wave signal including said trigger signal and data which defines said pseudo random-sequence in each fixed transmission cycle, and wherein said pseudo random-sequence is an M-sequence and data defining said pseudo random-sequence which said electromagnetic wave signal includes is M-sequence initial condition data.

29. The transmission device according to claim 28, wherein said transmission device comprises an electromagnetic wave transmission unit which determines an M-sequence initial condition in each transmission cycle to transmit an electromagnetic wave signal including a trigger signal indicative of transmission timing and data indicative of the M-sequence initial condition, and an ultrasonic transmission unit which generates an M-sequence waveform based on an M-sequence initial condition determined in each said transmission cycle to send out an ultrasonic signal of an M-sequence waveform simultaneously with said electromagnetic wave signal.

30. The transmission device according to claim 29, wherein said electromagnetic wave transmission unit changes said M-sequence initial condition in each said transmission cycle to send an electromagnetic wave signal including the trigger signal indicative of said transmission timing and data indicative of the M-sequence initial condition.

31. The transmission device according to claim 29, wherein said electromagnetic wave transmission unit determines said M-sequence initial condition whose predetermined characteristic polynomial is different in each said transmission cycle and transmits an electromagnetic wave signal including data indicative of the determined M-sequence initial condition.

32. The transmission device according to claim 29, wherein said electromagnetic wave transmission unit transmits an electromagnetic wave signal including data indicative of different M-sequence initial conditions and data indicative of different characteristic polynomials in each said transmission cycle.

33. The transmission device according to claim 29, wherein said electromagnetic wave transmission unit sends an electromagnetic wave signal including data which defines an M-sequence differing in each said transmission cycle, and said unit which generates a model waveform generates an ultrasonic model waveform modulated by said M-sequence based on M-sequence characteristic polynomial data and initial condition data corresponding to data defining said M-sequence that said electromagnetic wave signal received includes.

34. The transmission device according to claim 28, wherein said ultrasonic transmission unit sends said ultrasonic signal whose phase is modulated by said M-sequence data.

35. The transmission device according to claim 28, wherein said electromagnetic wave transmission unit is an infrared transmitter.

36. The transmission device according to claim 28, wherein said electromagnetic wave transmission unit transmits an electromagnetic wave signal including an initialization signal at every predetermined number of transmissions of said electromagnetic wave signal.

37. A reception device of a position detection system for detecting a position of a transmission device by receiving, at said reception device, an ultrasonic signal transmitted from said transmission device, comprising:

a reception unit which receives a trigger signal indicative of transmission timing and an ultrasonic signal modulated by data of a pseudo random-sequence having high self-correlativity which are simultaneously transmitted from said transmission device in a fixed transmission cycle, and a data processing unit which generates an ultrasonic model waveform of a pseudo random-sequence of said ultrasonic signal, calculates a correlation value between a waveform of a received ultrasonic signal and said ultrasonic model waveform generated, detects a first peak of the calculated correlation value and calculates an ultrasonic propagation time from a time point of reception of said trigger signal and a time point of detection of the correlation peak, as well as determining a position of said transmission device based on said ultrasonic propagation time calculated, wherein said reception device receives said ultrasonic signal and an electromagnetic wave signal including said trigger signal and data defining said pseudo random-sequence which signals are transmitted from said transmission device in a fixed transmission cycle, and wherein said pseudo random-sequence is an M-sequence and data defining said pseudo random-sequence which said electromagnetic wave signal includes is M-sequence initial condition data.

38. The reception device according to claim 37, wherein said data processing unit generates said ultrasonic model waveform of said ultrasonic signal by using data defining a pseudo random-sequence which said electromagnetic wave signal received includes.

39. The reception device according to claim 37, which receives the electromagnetic wave signal including the trigger signal indicative of transmission timing and data indicative of the M-sequence initial condition, and the ultrasonic signal of an M-sequence waveform generated based on said M-sequence initial condition which signals are simultaneously transmitted from said transmission device by determining the M-sequence initial condition in each transmission cycle, and which comprises:

a detection unit which detects said trigger signal and data indicative of said M-sequence initial condition from said electromagnetic wave signal received, and a storage unit which stores data indicative of an M-sequence initial condition of said detection unit and said ultrasonic signal received, wherein said data processing unit reads data indicative of said M-sequence initial condition from said storage unit, generates an ultrasonic model waveform modulated by an M-sequence and sequentially reads an ultrasonic signal stored in said storage unit to calculate a value of correlation with the ultrasonic model waveform modulated by said M-sequence.

40. The reception device according to claim 39, wherein said data processing unit generates, at every reception of said trigger signal, an ultrasonic model waveform modulated by said M-sequence based on the M-sequence initial condition changed and transmitted in each said transmission cycle.

41. The reception device according to claim 39, which receives, in each said transmission cycle, an electromagnetic wave signal including data indicative of said M-sequence initial condition whose predetermined characteristic polynomial is different which signal is transmitted from said transmission device, wherein said data processing unit generates an ultrasonic model waveform modulated by said M-sequence based on said predetermined characteristic polynomial and the M-sequence initial condition data detected from the electromagnetic wave signal received.

42. The reception device according to claim 39, which receives, in each said transmission cycle, an electromagnetic wave signal including data indicative of different M-sequence initial conditions and data indicative of different characteristic polynomials which signal is transmitted from said transmission device, wherein said detection unit detects a characteristic polynomial from a received electromagnetic wave signal and stores the polynomial in said storage unit, and said data processing unit generates an ultrasonic model waveform modulated by said M-sequence based on data indicative of said M-sequence initial condition and said characteristic polynomial data detected from the electromagnetic wave signal received.

43. The reception device according to claim 39, which receives an electromagnetic wave signal including data which defines an M-sequence differing in each said transmission cycle which signal is transmitted from said transmission device, wherein said data processing unit generates an ultrasonic model waveform modulated by said M-sequence based on M-sequence characteristic polynomial data and initial condition data corresponding to data defining said M-sequence which said electromagnetic wave signal received includes.

44. The reception device according to claim 37, which receives, from said transmission device, an electromagnetic wave signal including an initialization signal transmitted at every fixed number of transmissions of said electromagnetic wave signal, wherein said data processing unit initializes said M-sequence initial condition based on an initialization signal which said electromagnetic wave signal received includes.

45. The reception device according to claim 37, wherein said data processing unit samples a received ultrasonic signal in a fixed sampling cycle and stores the obtained signal in said storage unit, sets data indicative of a time point of reception of said trigger signal as a variable indicative of a starting time point of said correlation value calculation, reads a waveform of each sampled ultrasonic signal from said storage unit to calculate a value of correlation between a waveform of said ultrasonic signal sampled and an ultrasonic model waveform modulated by said M-sequence, searches a plurality of sequentially calculated correlation values for a first correlation value peak, when no correlation value peak is detected, increments said variable by a unit amount to read a subsequent sampled ultrasonic signal from said storage unit and calculate a value of correlation between a waveform of the ultrasonic signal and an ultrasonic model waveform modulated by said M-sequence, and when said first correlation value peak is detected, calculates a propagation time of said ultrasonic signal from a time point corresponding to a value of said variable and a time point of reception of said trigger signal.

\* \* \* \* \*